(12) United States Patent
Yamamichi

(10) Patent No.: US 8,773,680 B2
(45) Date of Patent: Jul. 8, 2014

(54) INFORMATION PROCESSING APPARATUS AND INFORMATION PROCESSING METHOD

(71) Applicant: Canon Kabushiki Kaisha, Tokyo (JP)

(72) Inventor: Masaki Yamamichi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/762,254

(22) Filed: Feb. 7, 2013

(65) Prior Publication Data

US 2013/0235402 A1 Sep. 12, 2013

(30) Foreign Application Priority Data

Mar. 9, 2012 (JP) ................................. 2012-053688

(51) Int. Cl.
| | |
|---|---|
| *G06F 15/00* | (2006.01) |
| *G06F 3/12* | (2006.01) |
| *G06K 1/00* | (2006.01) |
| *G06K 15/00* | (2006.01) |

(52) U.S. Cl.
CPC ............ *G06F 3/1204* (2013.01); *G06F 3/1255* (2013.01); *G06F 3/1254* (2013.01); *G06K 15/00* (2013.01)
USPC .......................................... 358/1.13; 358/1.1

(58) Field of Classification Search
CPC ..... G06F 3/1204; G06F 3/1255; G06F 3/1254; G06K 15/00
USPC .......................................... 358/1.1, 1.13, 1.14
See application file for complete search history.

(56) References Cited

U.S. PATENT DOCUMENTS

| | | | |
|---|---|---|---|
| 8,587,824 B2 * | 11/2013 | Furuya | 358/1.3 |
| 2010/0182627 A1 | 7/2010 | Yamamichi | |
| 2012/0002221 A1 * | 1/2012 | Zhan | 358/1.9 |

FOREIGN PATENT DOCUMENTS

JP 7-261958 A 10/1995

* cited by examiner

*Primary Examiner* — Douglas Tran
(74) *Attorney, Agent, or Firm* — Fitzpatrick, Cella, Harper & Scinto

(57) ABSTRACT

The print output system obtains, when performing printing from a first application that is operated in a first execution environment, information regarding a printer driver, and determines whether or not settings of print functionality can fully be performed in the first execution environment. If it is determined that the settings of print functionality cannot fully be performed, then the print output system causes a second application that is operated in a second execution environment to display a user interface through which print settings are executed and to execute print output, allowing fully utilizing the print functionality.

19 Claims, 9 Drawing Sheets

FIG. 1
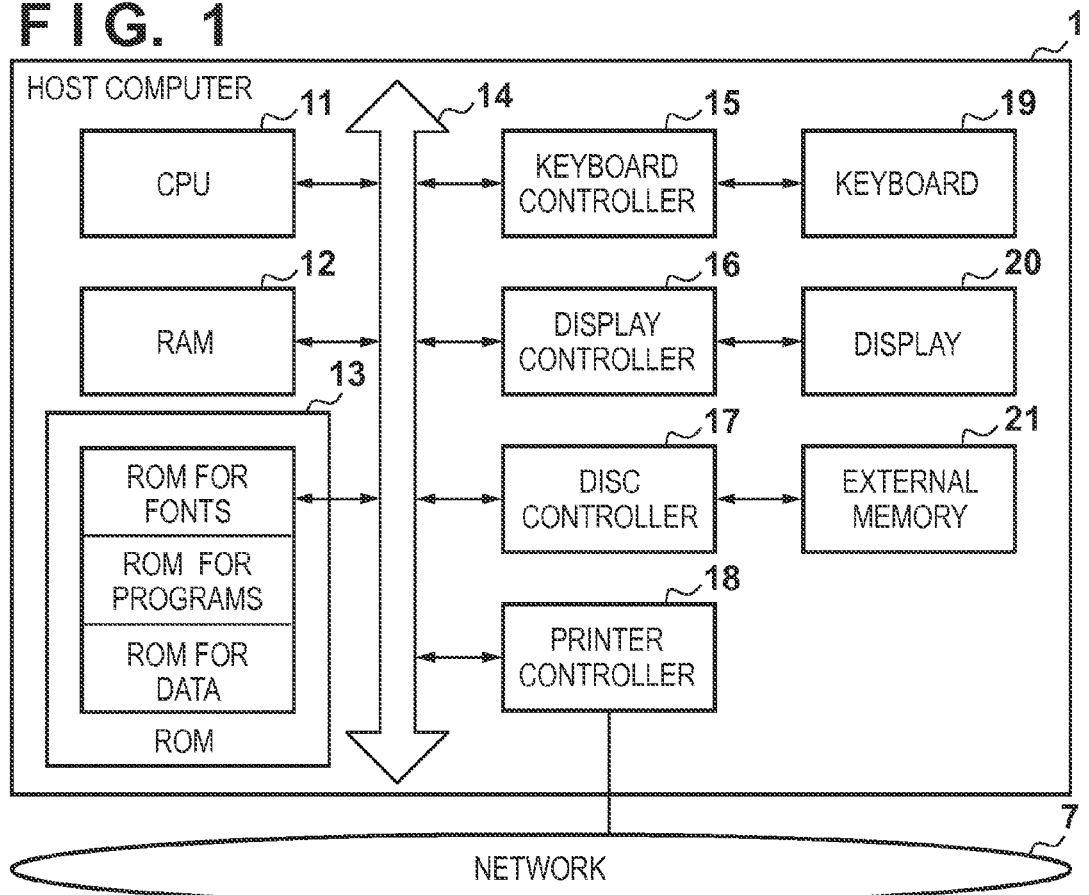
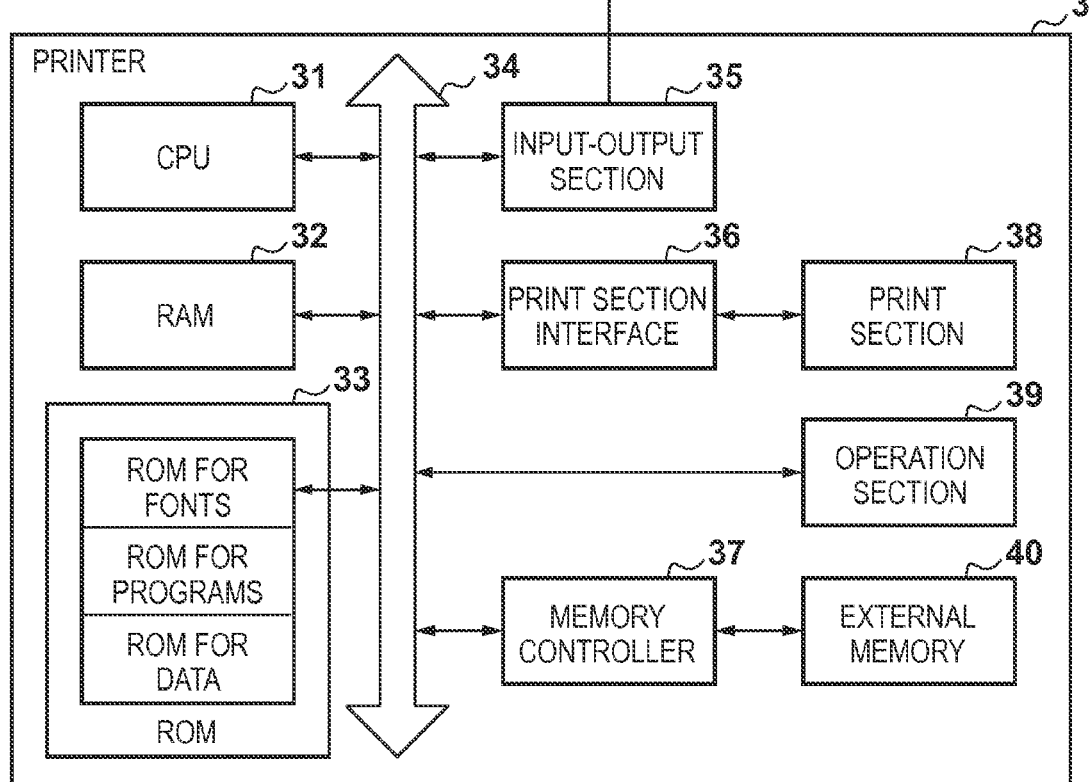

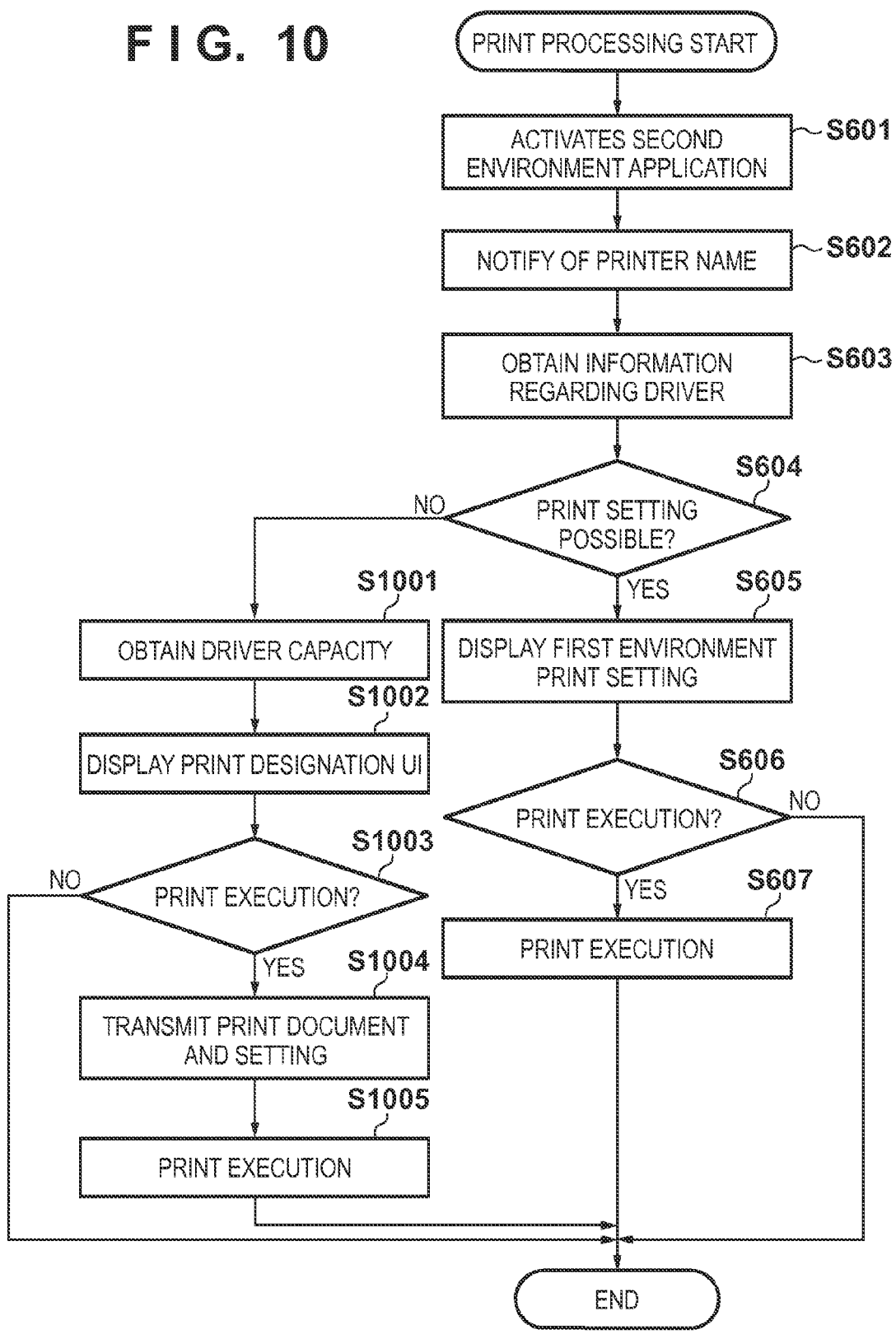

INFORMATION PROCESSING APPARATUS AND INFORMATION PROCESSING METHOD

BACKGROUND OF THE INVENTION

1. Field of the Invention

The present invention relates to an information processing apparatus and a method for processing information that control the print output of, for example, a plurality of printers.

2. Description of the Related Art

Conventionally, when printing an electronic document from an application, a user interface (UI) that is provided by a printer driver is displayed through which advanced print settings are configured. In recent years, operating systems that provide novel UIs with high operability have also been developed for devices such as mobile phones and tablets that have only a touch panel.

Adopting such a novel OS (hereinafter referred to as a "new OS") involves a new invoking method for invoking a printer driver that is compatible with the new OS from an application that is compatible with the new OS. In this context, the expression "compatible" may mean that the objects are generated for execution under a new OS but not older versions of the OS, and may also be referred to as "native". However, in popular operating systems, such as Windows (Registered Trademark) OS provided by Microsoft (Registered Trademark) Corporation for example, an upgraded new OS generally has a mechanism for maintaining compatibility with the past assets, e.g., compatibility with drivers and the like that are compatible with a conventional OS (hereinafter referred to as an "old OS"), in order to ensure the succession of software assets. With a new OS, therefore, printer drivers that are compatible with an old OS and suitable for a conventional method for invoking from an application are available, and there may also be printers for which there is no other choice than to use such a printer driver compatible with an old OS. The same applies to devices other than printers. Further, there may be the case where one device includes a plurality of types of printer drivers having different attributes, such as printer drivers compatible with an old OS and printer drivers that are suitable for a new method for invoking from an application and compatible with a new OS. In this context, "compatible" may refer to a situation where software that has compatibility with an old OS is executable under a new OS.

There is also the case where, together with the change of the invoking method, the structure of print setting data may be changed. For example, in Windows (Registered Trademark) of Microsoft (Registered Trademark) Corporation, conventionally, an operating system (including drivers) has been invoked from an application via an application interface (API) that is referred to as "Win32", and binary data that is referred to as "DEVMODE" has been used as print setting data. However, in the new OS called "Windows 8", the operating system (including drivers) is invoked from an application via an application interface (API) that is referred to as "WinRT", and XML data that is referred to as "PrintTicket" is added to the print setting data. However, as described above, the Win32 API is also provided in Windows 8 in order to maintain compatibility with the conventional Windows OS, so that an application compatible with Win32 and thus a driver compatible with the conventional OS using DEVMODE are executable. Further, a driver that uses DEVMODE and is compatible with Win32 can also be used via the WinRT API. Therefore, there may be the case where one device includes two types of drivers, that is, drivers suitable for two types of formats of print setting data (for example, DEVMODE and PrintTicket), respectively. In the example of Windows, the application compatible with Win32 is referred to as a desktop application, and the application compatible with WinRT is referred to as a metro application. Also, the printer driver that is compatible with Win32 and uses, for example, DEVMODE is referred to as a V3 driver, and the printer driver that is compatible with WinRT and uses PrintTicket is referred to as a V4 driver.

As described above, in Windows 8, the V3 driver can be invoked from the metro application and the desktop application. Accordingly, if one printer device is provided with both a V3 driver and a V4 driver, the metro application will select and use any one of the drivers since a metro application can use both drivers.

Not only in the case of Windows 8 but also in the case where one device is available from a plurality of routes, as a technique for selecting one of the plurality of routes, Patent Literature 1 discloses a technique for automatically selecting, from a plurality of print data commands that are held as attributes by an image processing apparatus, an appropriate print data command depending on print requirements, such as user's preference in image quality or speed.

Patent Literature 1

Japanese Patent Laid-Open No. 07-261958

However, when a printer driver that is provided for a given print device and compatible with an old OS is used, the same functionalities cannot always be used when the printer driver is invoked from an application compatible with an old OS (hereinafter referred to as a "native mode") and when the printer driver is invoked from an application compatible with a new OS (hereinafter referred to as a "compatible mode"). Taking the example of Windows 8, available functionalities may differ from each other between the native mode in which a V3 printer driver is invoked from the desktop application, and the compatible mode in which the V3 printer driver is invoked from the metro application. This is because the compatibility between the metro application and the V3 printer driver is maintained since the operating system knows the definition of print settings in DEVMODE, but neither can know the print settings that were originally defined by the printer driver, nor can the printer driver itself access the operating system and deliver the print settings to the operating system. In Windows 8, therefore, the print settings originally defined by the printer driver are not available, since they can neither be displayed in a UI (hereinafter referred to as a "metro style UI") nor of course be configured. In contrast, if the same printer driver is used from the desktop application via Win32, then expanded functionality as well can be set and thus made available.

Accordingly, if, for example, a driver that is suitable for a conventional invoking method and compatible with an old OS is invoked by a new invoking method from an application that is suitable for this new invoking method and compatible with a new OS, there has been the case where expanded functionality that is originally supported by the driver cannot be used. Because of this, although use of the invention described in Patent Literature 1 makes it possible to preferentially use from the new OS the driver compatible with an old OS or to exclusively use the driver compatible with an old OS if only this driver is available, all functionalities available when this driver is executed under the old OS are not always available under the new OS.

SUMMARY OF THE INVENTION

Therefore, provided are an information processing apparatus and a method for processing information that enable expanded functionality originally supported by a driver compatible with an old OS to be made available, even when the driver is used from an application that is compatible with a new OS.

According to an aspect of an embodiment, the present invention thus has the following configuration. An information processing apparatus for performing printing using a printer driver that is managed by an operating system providing a plurality of different execution environments for application programs, a compatible print setting data format being defined in advance for each of the execution environments, the information processing apparatus executing a first application that is operated under a first execution environment, the first application comprising:

an obtainment unit configured to obtain information regarding a printer driver to be used;

a determination unit configured to determine, on the basis of the obtained information regarding the printer driver, whether print settings and print processing are executed in the first execution environment or in a second execution environment;

a display unit configured, if it is determined that the print settings and the print processing are executed in the second execution environment, to let a second application that is operated under the second execution environment display a user interface through which the print settings are executed in the printer driver; and a unit configured to transmit document data to be printed to the second application so as to let the second application execute print output.

Further, according to another aspect, an information processing apparatus for performing printing using a printer driver that is managed by an operating system providing a plurality of different execution environments for application programs, a compatible print setting data format being defined in advance for each of the execution environments, the information processing apparatus executing a first application that is operated under a first execution environment, the first application comprising:

an obtainment unit configured to obtain information regarding a printer driver to be used;

a determination unit configured to determine, on the basis of the obtained information regarding the printer driver, whether print settings and print processing are executed in the first execution environment or in a second execution environment;

a display unit configured, if it is determined that the print settings and the print processing are executed in the second execution environment, to let a second application that is operated under the second execution environment obtain information regarding print functionality of the printer driver, and to display an user interface through which the print settings are executed on the basis of the information regarding print functionality; and a unit configured to transmit document data to be printed and the print settings to the second application so as to let the second application execute print output according to the print settings.

Further, according to another aspect, an information processing apparatus for performing printing using a printer driver that is managed by an operating system providing a plurality of different execution environments for application programs, a compatible print setting data format being defined in advance for each of the execution environments, the information processing apparatus executing a first application that is operated under a first execution environment, the first application comprising:

a determination unit configured to let a second application that is operated under a second execution environment obtain a version of a printer driver to be used, and to determine a format of print setting data that is prioritized in accordance with the version; an obtainment unit configured to let the second application obtain, from the printer, information regarding print functionality of the printer driver, in the format determined by the determination unit;

a display unit configured to display, on the basis of the information regarding print functionality obtained by the obtainment unit, a user interface through which print settings are executed; and a unit configured, if the prioritized print setting data is in a format that is compatible with the second execution environment, to transmit document data to be printed and the print settings to the second application so as to let the second application execute print output according to the print settings, and if the prioritized print setting data is in a format that is compatible with the first execution environment, to transmit document data to be printed to the second application so as to let the second application execute print output.

In accordance with these configurations, in the case where print settings and print output are executed under a given OS, it is possible to provide, even when a printer driver is executed in a compatible mode, substantially the same functionalities as in a native mode.

Further features of the present invention will become apparent from the following description of exemplary embodiments with reference to the attached drawings.

BRIEF DESCRIPTION OF THE DRAWINGS

FIG. 1 is a diagram illustrating examples of hardware configurations of a host computer and a printer.

FIG. 10 is a flowchart illustrating the procedure when print settings and print output of a second embodiment are performed.

DESCRIPTION OF THE EMBODIMENTS

First Embodiment

Figure 2:
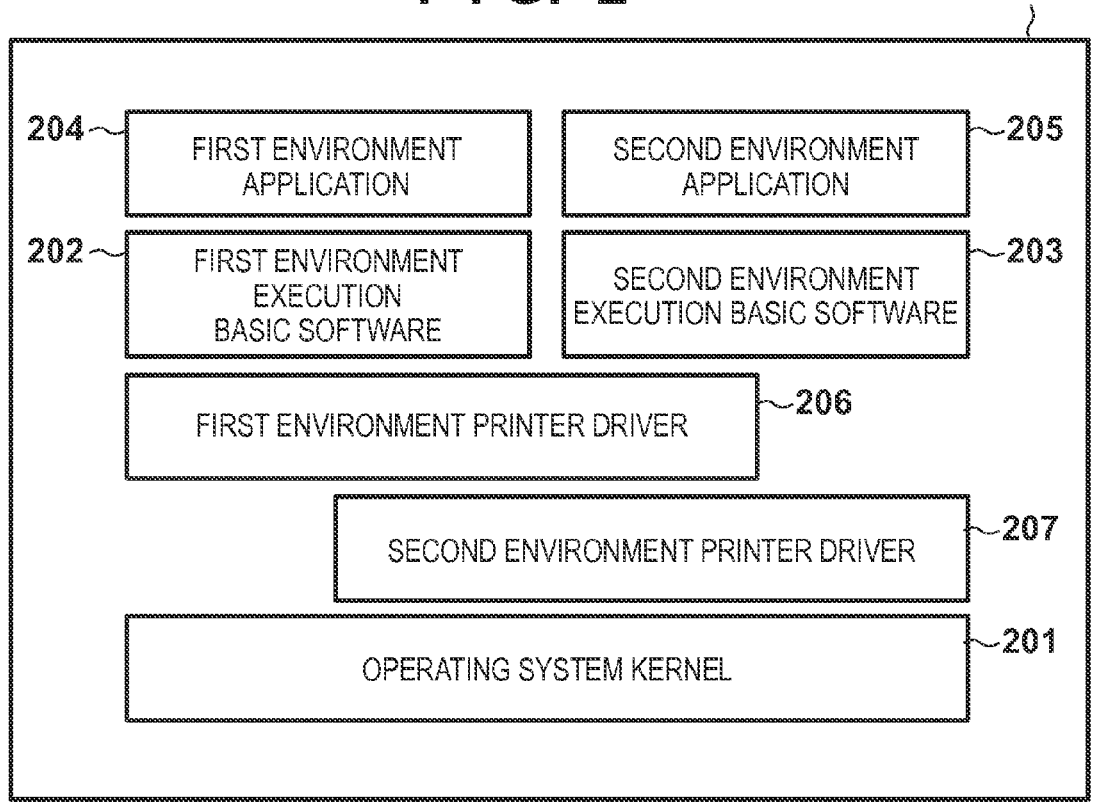
FIG. 2 is a diagram illustrating an example of a software configuration of a print output system.

The following will describe, with reference to the drawings, the best mode for carrying out the present invention. Note that the following embodiments neither limit the present invention according to the patent claims nor are all combinations of the features described in the present embodiments necessarily essential for the solution of the present invention.

Hardware Configuration

FIG. 1 is a block diagram illustrating an example of a hardware configuration of a print control system of the present embodiment. A host computer 1 includes a CPU (Central Processing Unit) 11, a RAM (Random Access Memory) 12, a ROM (Read Only Memory) 13, a system bus 14, and a keyboard controller 15. The host computer 1 further includes a display controller 16, a disc controller 17, a printer controller 18, a keyboard 19, a display 20, and an external memory 21. The CPU 11 controls execution of document processing and print processing based on the document processing, in accordance with a document processing program or the like that is stored in a ROM for programs, which is included in the ROM 13 or the external memory 21. Further, the CPU 11 executes an operating system and device drivers that are provided for the respective devices. In this context, "document processing" refers to processing of a document including, for example, figures, images, characters, tables (this includes spreadsheets and the like), and the like. The CPU 11 controls the devices that are connected to the system bus 14. The RAM 12 functions as a main memory, a work area, or the like of the CPU 11. Examples of the operating system encompass Windows 8, and examples of the driver encompass a printer driver.

The ROM 13 includes the ROM for programs, a ROM for fonts, and a ROM for data. In the ROM for programs, which is included in the ROM 13 or in the external memory 21, an operating system (OS) program, which is a control program of the CPU 11, is stored, for example. In the ROM for fonts, which is part of the ROM 13, or in the external memory 21, document files, font data, and the like are stored that are used in the document processing. And, in the ROM for data, which is part of the ROM 13, or in the external memory 21, various types of data are stored for use when the document processing or the like is performed. The CPU 11, the RAM 12, the ROM 13, the keyboard controller 15, the display controller 16, the disc controller 17, and the printer controller 18 are connected to the system bus 14.

The keyboard controller 15 controls key input from the keyboard 19 or a pointing device (not shown). The display controller 16 controls display performed by the display 20. The disc controller 17 controls access to the external memory 21. Note here that, as the external memory 21, a hard disc or a Floppy (Registered Trademark) disc is used in which a boot program, various types of applications, font data, a user file, a document file, and a printer control command generation program, for example, are stored. The printer controller 18 is connected to a printer 3 via a network 7, and executes processing for controlling communication with the printer 3. Further, the CPU 11 displays, in accordance with a command that has been instructed via a mouse cursor (not shown) and the like on a display 10, user interfaces such as various windows that were registered in advance, and executes various types of data processing. A user can activate the application, display the user interface, open the window for print settings, configure settings of the printer, and execute printing.

The printer 3 serving as an image processing apparatus (or an image forming apparatus) includes a CPU 31, a RAM 32, a ROM 33, a system bus 34, an input-output section 35, a print section interface 36, a memory controller 37, a print section 38, an operation section 39, and an external memory 40. The CPU 31 controls the entire printer 3. The CPU 31 inputs an image signal as the print output information to the print section 38 via the print section interface 36, in accordance with the control program or the like that is stored in the ROM 33 or the external memory 40. Hereinafter, the print section 38 is also referred to as a printer engine.

The RAM 32 functions as a main memory, a work area, or the like of the CPU 31. Further, an optional RAM (not shown) that is connected to an additional port makes it possible to expand memory capacity. The RAM 32 is used as an output information deployment area, an environmental data storage area, a NVRAM (Non Volatile Random Access Memory) and the like. The ROM 33 includes a ROM for fonts, a ROM for programs, and a ROM for data. In the ROM for fonts, which is included in the ROM 33, font data and the like are stored for use when print output information is generated. In the ROM for programs, which is included in the ROM 33, a control program and the like of the CPU 31 are stored. Further, in a printer that does not include an external memory 40, such as a hard disc, various types of information for use for operation processing of the printer 3 are stored in the ROM for data, which is included in the ROM 33.

The CPU 31, the RAM 32, the ROM 33, the input-output section 35, the print section interface 36, the memory controller 37, and the operation section 39 are connected to the system bus 34.

The input-output section 35 is a network card or the like. The CPU 31 transmits and receives data between the printer 3 and the host computer 1 via the input-output section 35 and the network 7. The host computer 1 is hereby notified of information or the like within the printer 3. The print section interface 36 is an interface between the CPU 31 and the print section 38. The memory controller 37 controls access to the external memory 40. The print section 38 forms an image based on the image signal that was input from the CPU 31 via the print section interface 36, fixes the formed image to a paper using a fuser, thereby generating an output image.

The operation section 39 performs processing in accordance with operation of the user. The operation section 39 is, for example, an operation panel and includes a switch that is provided for operation by the user, an LED (Light Emitting Diode) display device, and the like. Further, in the present embodiment, it is also possible that the printer 3 includes an NVRAM (now shown) that stores printer mode setting information that was input from the operation section 39. The external memory 40 is a hard disc, an IC card, or the like. The external memory 40 is optionally connected and stores font data, an emulation program, form data, and the like.

Software Configuration

FIG. 2 is an example of a configuration of an OS, which is a software execution environment in which processes of the present embodiment are executed. Hereinafter, names that correspond to constituent elements of Windows 8 OS are added in parentheses. Meanwhile, in the operating system, an OS kernel layer 201 is provided as a base, and thereon an execution basic software 202 in an application execution environment that is a first execution environment (hereinafter referred to as a first environment execution basic software), and an execution basic software 203 in an application execution environment that is a second execution environment (hereinafter referred to as a second environment execution basic software) are provided in parallel. The first environment assumes mainly touch panels of mobile devices such as mobile phones, and tablets. Taking the example of the Windows 8 OS, the first environment execution basic software and the second environment execution basic software correspond to WinRT and Win32, respectively. Therefore, the first environment execution basic software 202 has basic functionality required for an application that is operated on the touch panel (for example, functionality to display a user interface to be displayed on the touch panel). Also, the first environment execution basic software 202 provides a first environment application (also referred to as a "first application" or a "first application program") with an API that is an interface with the operating system. In the Windows 8 OS, the first environment application corresponds to a metro application, and the interface with the application that is provided by the OS corresponds to a WinRT API. This API is an interface through which, for example, basic information is obtained or a user interface is displayed, and is required for operating, under the touch panel environment, software such as a printer driver and applications that are registered in the OS.

On the other hand, the second environment is assumed to be a conventional computer screen. Therefore, the second environment execution basic software 203 has functionality (for example, to display a user interface through which advanced settings are configured) that is required for an application that is operated on the conventional computer screen. Also, the second environment execution basic software 203 provides a second environment application with an API that is an interface with the operating system. In Windows 8 OS, the second environment application (also referred to as "second application" or "second application program") corresponds to a desktop application, and the interface with the application that is provided by the OS corresponds to a Win32 API. This API is an interface through which detailed information on the software such as printer drivers and applications that are registered in the OS is obtained, and a user interface is displayed.

On top of these, the first environment application 204 (for example, a metro application) and the second environment application 205 (for example, a desktop application) are executable. The applications described in the present embodiment are applications that are executed in layers for the first environment 204 and the second environment application 205, while communicating information with the kernel 201 via the first environment execution basic software 202 and the second environment execution basic software 203. Further, the first environment application 204 according to the present invention is, for example, a document processing program that is compatible with WinRT, and has print functionality to print document data, for example. Of course, the first environment application 204 may be another application. According to the present embodiment, the second environment application 205 refers to a specific program for obtaining print setting data of the second environment printer driver 207, displaying a user interface, and configuring settings of print data, but not to a general application executable in the second environment. In the present embodiment, this program may also be referred to, for example, as a second environment UI application.

A printer driver is made available by being registered in the OS, and the application can communicate with the printer driver via any of the execution basic software programs. Namely, the first environment application 204 communicates with the printer driver via the first environment execution basic software 202, and the second environment application 205 communicates with the printer driver via the second environment execution basic software 203.

The first environment printer driver 206 is a printer driver that is suitable for being invoked by the first environment application 204 operated on the first environment execution basic software 202. In Windows 8, the first environment printer driver 206 corresponds to a printer driver that is referred to as a WinRT printer driver or a V4 printer driver in the present embodiment. The first environment execution basic software 202 provides an interface via which the first environment application 204 communicates with the printer driver. And, it is necessary for the first environment printer driver 206 to be compatible with at least a portion, defined to be essential, of the above-mentioned interface provided by the execution basic software 202. A version number that is greater than or equal to a predetermined value is added to any printer driver that is compatible with at least a portion, defined to be essential, of the above-mentioned interface provided by the execution basic software 202. The version of the first environment printer driver 206 has a value greater than the version of the second environment printer driver 207. In the present embodiment, since the version is used in order to determine whether a printer driver is for the first environment or for the second environment, it is presupposed that the printer drivers for the first environment and for the second environment have different versions. Note that, in Windows 8, the second environment printer driver 207 corresponds to a printer driver that is referred to as a Win32 printer driver or a V3 printer driver in the present embodiment.

Therefore, it is possible for the first environment application 204 to utilize the functionality of a first environment printer driver 206 via the interface provided by the first environment execution basic software 202. For example, the first environment application 204 can display, via the first environment execution basic software 202, a user interface for detailed print settings that is provided by the first environment printer driver 206.

However, since the functionality or the interface of the printer driver provided by the first environment execution basic software 202 are limited to basic functionality or an interface that are required for operation on a touch panel, the obtainable information will also be basic information. For example, the information is limited to names of the printer drivers registered in the OS, and the like, and no information on versions of the printer drivers and on functionalities of the printer drivers can be obtained.

Also, the first environment printer driver 206 supports print setting data in the XML format (for example, Print Ticket in Windows (Registered Trademark) 8) that was defined through the interface provided by the first environment execution basic software 202. That is, it is possible to exchange print setting data in the XML format with the operating system. The second environment application 205 can obtain detailed information regarding the first environment printer driver 206 via the second environment execution basic software 203. For example, the second environment application 205 can obtain the version of the first environment printer driver 206. Since print setting data in the XML format is also supported by the interface provided by the second environment execution basic software 203, the second environment application 205 can obtain information on the functionality of the first environment printer driver 206 in the XML format (for example, "Print Capability" in Windows (Registered Trademark) 8).

However, the first environment printer driver 206 does not support print setting data in the binary format (for example, "DEVMODE" in Windows (Registered Trademark)) that is defined through the interface provided by the second environment execution basic software 203. Therefore, the second environment application 205 cannot obtain detailed information on the functionality of the first environment printer driver 206 in the binary format (that is, as DEVMODE itself).

On the other hand, the second environment printer driver 207 is a printer driver that is suitable for being invoked from the second environment application 205 that is operated on the second environment execution basic software 203. The second environment execution basic software 203 provides an interface via which the second environment application 205 communicates with the printer driver. And, the second environment printer driver 207 is compatible with at least a portion, defined to be essential, of the interface provided by the second environment execution basic software 203. However, the second environment printer driver 207 is not compatible with the interface provided by the first environment execution basic software 202.

As described above, in order that the version number of the printer driver has a value that is greater than or equal to a predetermined value in view of a general rule for giving version numbers, the printer driver needs to be compatible with at least a portion, defined to be essential, of the interface provided by the execution basic software 202. That is, the version of the second environment printer driver 207 has a value that is less than a predetermined value. Therefore, the first environment printer driver 206 differs from the second environment printer driver 207 in version. This may cause the first environment application 204 not to be able to utilize all the functionalities of the second environment printer driver 207 via the interface provided by the first environment execution basic software 202.

For example, the first environment application 204 cannot display, via the first environment execution basic software 202, a user interface through which print settings of the second environment printer driver 207 are configured. The first environment application 204 displays a simple user interface for print settings (that is, only some of the setting items) that is provided by the first environment execution basic software 202. Therefore, the first environment application 204 cannot utilize all the functionalities of the second environment printer driver 207. For example, print settings with respect to functionalities that are originally provided by the Win32 printer driver and not defined by the operating system cannot be configured unless the driver can directly access DEVMODE, so that those functionalities cannot be provided. Accordingly, when a metro application uses a Win32 printer driver via a WinRT API, print settings that are defined in DEVMODE by the OS can be displayed in the user interface (that is referred to as "metro style" in Windows 8) displayed by WinRT, enabling the user to configure the print settings. However, print settings that were originally defined by the Win32 printer driver cannot be displayed since WinRT cannot know the contents of the print settings, making it of course impossible for the user to configure the print settings.

In contrast, the second environment printer driver 207 can provide functionalities that are available for the first and second environment printer drivers via the interface provided by the second environment execution basic software 203. Therefore, the second environment application 205 can display a user interface for detailed print settings that are provided by the second environment printer driver 207, via the second environment execution basic software 203 (that is referred to as "desktop style" in Windows 8).

Also, the second environment printer driver 207 supports print setting data in the binary format that was defined through the interface provided by the second environment execution basic software 203. The second environment application 205 can obtain detailed information regarding the second environment printer driver 207 via the second environment execution basic software 203. For example, the second environment application 205 can obtain the version of the second environment printer driver 207. The second environment application 205 can also obtain information on the functionalities of the second environment printer driver 207 in the binary format. However, the second environment printer driver 207 does not necessarily support print setting data in the XML format that was defined through the interface provided by the second environment execution basic software 203. Therefore, the second environment application 205 cannot necessarily obtain more detailed information of the first environment printer driver 206, as print setting data in the XML format.

The components are present as files stored in the external memory 21 illustrated in FIG. 1. During execution, these files are loaded into the RAM 12 by a module that uses the files so as to be executed. In this regard, "kernel" refers to a central core part of the OS whose architecture is of hierarchical type, and manages communication between the hardware components and the software components of the computer. In particular, the "kernel" serves to provide an interface via which the hardware can communicate with the software by abstracting a CPU, a memory, an input-output hardware, and the like.

Although, in the present embodiment, an example is described in which two execution environments are provided in one computer as illustrated in FIG. 2, another case in which three or more execution environments are provided is also implementable.

Configuration of First Environment Application 204

Figure 3:
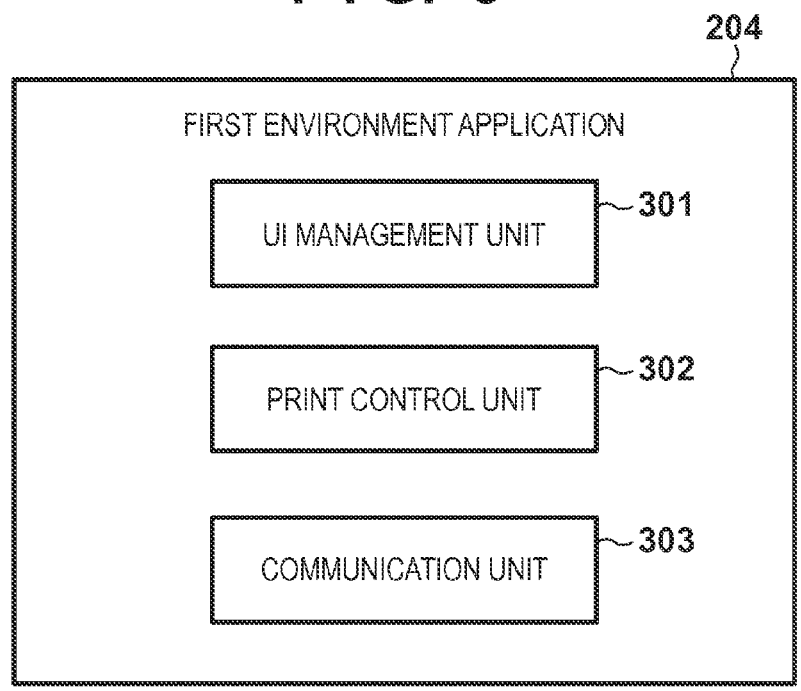
FIG. 3 is a diagram illustrating an example of a software configuration of a first environment application.

FIG. 3 is a diagram illustrating an example of a configuration of the first environment application 204. The first environment application 204 can read, for example, a document file that exists in the external memory 21 via a file system of the OS. The contents of the document file that was read can be displayed and printed. When referenced, the document file is loaded into the RAM 12. A UI management unit 301 controls, using the interface provided by the first environment execution basic software 202, display of a user interface 501 of FIG. 5 and the like on the display 20, and input from the user (for example, input using a pointing device or keyboard via the user interface).

A print control unit 302 controls print output using the interface provided by the first environment execution basic software 202. A communication unit 303 controls communication with the second environment application 205.

Configuration of Second Environment Application 205

Figure 4:
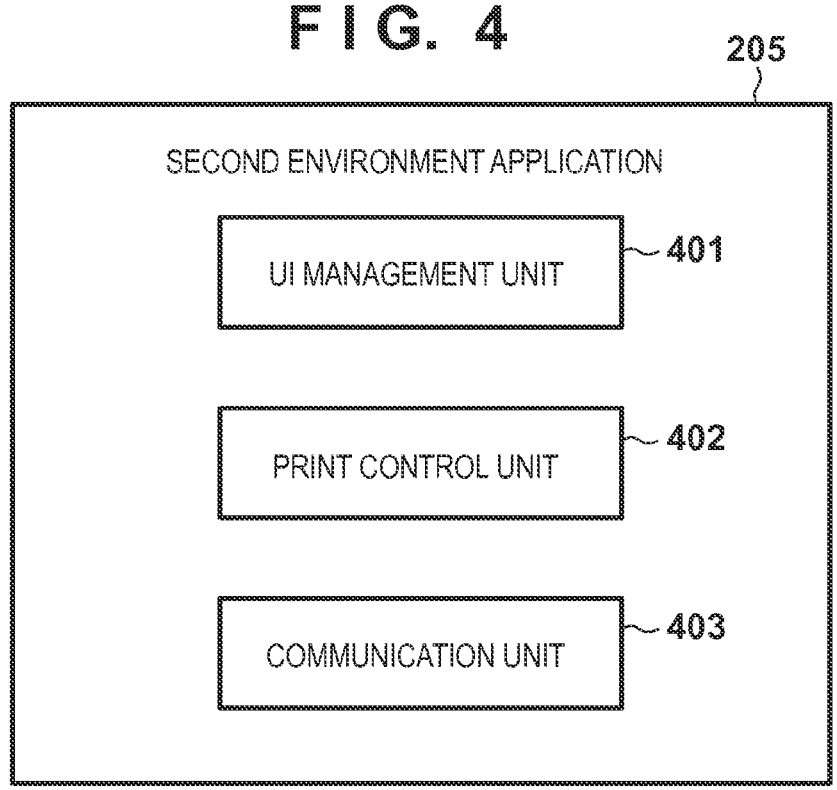
FIG. 4 is a diagram illustrating an example of a software configuration of the first environment application.
Figure 9A:
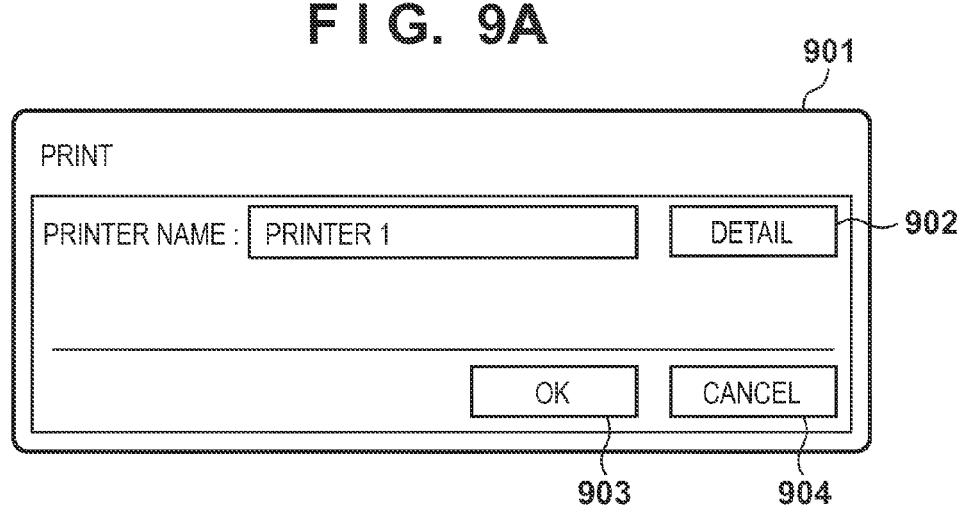
FIGS. 9A and 9B are diagrams each illustrating an example of a user interface for print settings of a second environment application.
Figure 9B:
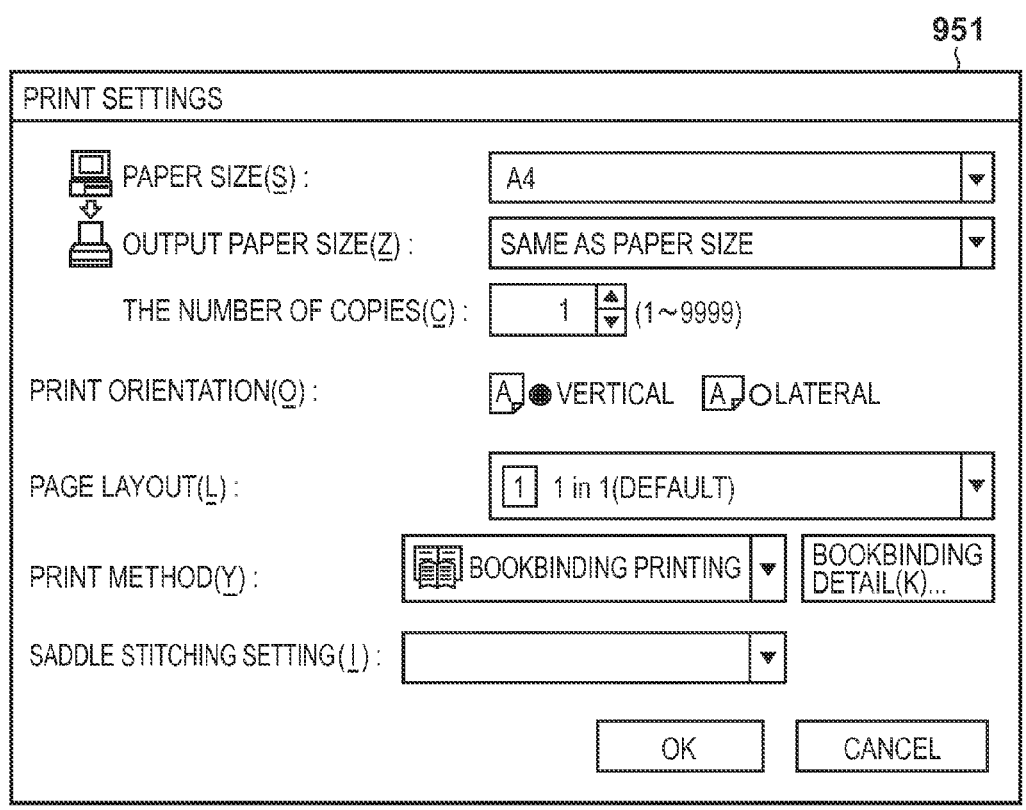

FIG. 4 is a diagram illustrating an example of a configuration of the second environment application 205 according to the present embodiment. It should be noted that "the second environment application 205 according to the present embodiment" does not refer to an ordinary application program but a specific program according to the present invention. The second environment application 205 can read the document file that was delivered by the first environment application 204. The document file that was read can be printed. When referenced, the document file is loaded into the RAM 12. A UI management unit 401 controls, using the interface defined by the second environment execution basic software 203, display of a user interface 901 of FIG. 9A, a user interface 951 of FIG. 9B, and the like on the display 20, and input from the user (for example, input using a keyboard).

A print control unit 402 controls, using the interface defined by the second environment execution basic software 203, obtainment of information regarding the version and the functionalities of the printer driver, print settings, and print output. Because, as described with respect to FIG. 2, in the second environment execution basic software 203, the interfaces via which communication with the printer drivers are defined in both the XML format and the binary format, the print control unit 402 can obtain information regarding the functionalities of both the first environment printer driver 206 and the second environment printer driver 207. The communication unit 303 controls communication with the first environment application 204.

Summary of Software Configuration

The following is a summary of the above-mentioned features of the software configuration of the information processing apparatus according to the present embodiment.

(1) The first environment application 204 and the second environment application 205 utilize functionalities that are provided by an operating system, via the first environment execution basic software 202 and the second environment execution basic software 203, respectively.

(2) The functionalities provided by the operating system encompass functionalities that are provided by the first environment printer driver 206 and the second environment printer driver 207.

(3) The first environment printer driver 206 supports print setting data in the XML format. On the other hand, the second environment printer driver 207 supports print setting data in the binary format.

(4) The first environment execution basic software 202 supports the XML format, as a format of print setting data to be handled. On the other hand, the second environment execution basic software 203 supports the binary format and the XML format, as a format of print setting data to be handled.

(5) The first environment execution basic software 202 can also access print setting data in the binary format for the second environment printer driver 207 but can neither display nor set the items that are originally extended for the second environment printer driver 207.

(6) The second environment execution basic software 203 can access both print setting data in the XML format for the first environment printer driver 206 and print setting data in the binary format for the second environment printer driver 207.

(7) The first environment execution basic software 202 and the second environment execution basic software 203 can display the print setting data in the user interface in the corresponding formats, respectively, and enable the user to configure print settings.

The above-described summary related to an ordinary operating system, but it is also possible to summarize as follows, taking the example of Windows 8.

(1) The metro application (for example, a document processing program) and the desktop application (for example, the second environment UI application) utilize functionalities that are provided by the Windows 8 operating system, via WinRT and Win32, respectively.

(2) The functionalities provided by the operating system encompass functionalities that are provided by the WinRT printer driver and the Win32 printer driver.

(3) The WinRT printer driver supports PrintTicket, as print setting data. On the other hand, the Win32 printer driver 207 supports DEVMODE, as print setting data.

(4) WinRT supports PrintTicket, as a format of print setting data to be handled. On the other hand, Win32 supports DEVMODE and PrintTicket, as a format of print setting data to be handled.

(5) The WinRT can access DEVMODE for the Win32 printer driver but can neither display nor set the items that are originally extended for the Win32 printer driver.

(6) Win32 can access both PrintTicket for the WinRT printer driver, and DEVMODE for the Win32 printer driver.

(7) WinRT and Win32 can display the print setting data in the metro style UI and the desktop style UI, which are the corresponding formats of the user interface, respectively, and enable the user to configure print settings.

A summary of the software configuration has been given as above. Accordingly, there may be the case where all the print settings of the second environment printer driver cannot be handled from the first environment application, so that it is impossible to execute the functionalities according to the print settings that cannot be handled.

Flow of Print Output Processing

Figure 5:
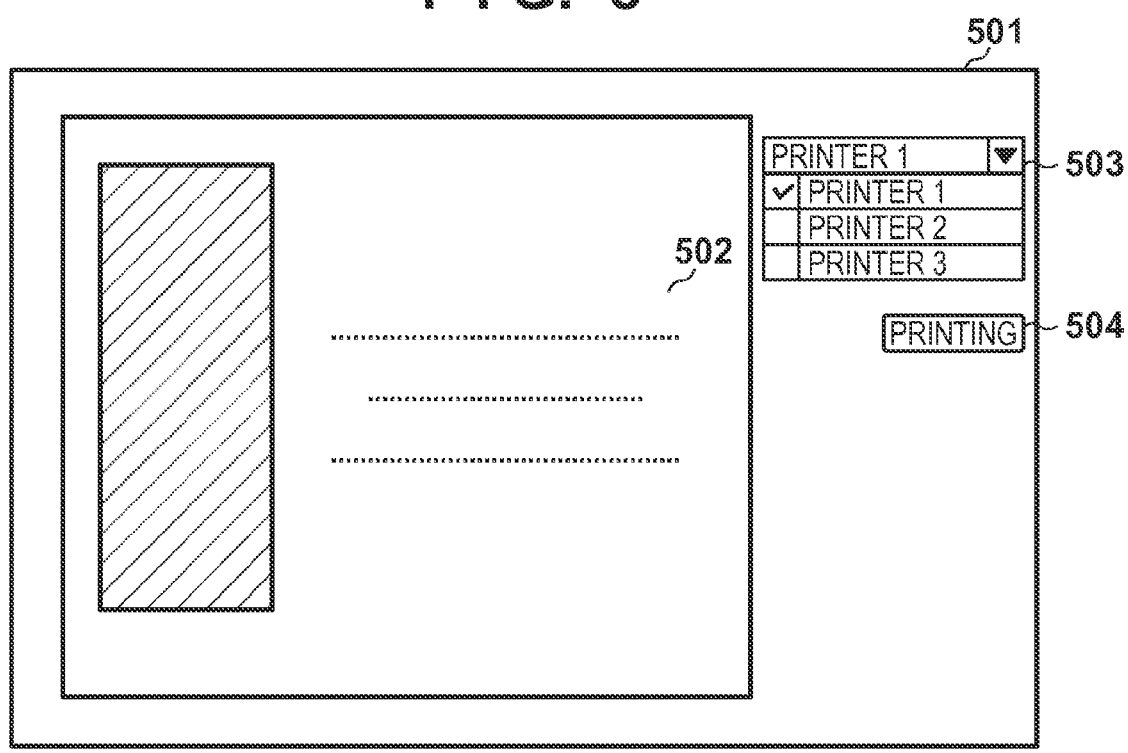
FIG. 5 is a diagram illustrating an example of a user interface of the first environment application.

The flow of print output processing of the present embodiment will be described with reference to FIGS. 5, 6, 7, 8, 9A, and 9B. FIG. 5 is a diagram illustrating an example of a user interface of the first environment application 204. In this example, the first environment application 204 is a document processing program, and the user interface 501 indicates a main screen. On a page 502, the contents of the document file that is currently referenced is displayed. Using the control 503, it is possible to select a printer driver to be used for printing. By pushing a button 504, print output processing is started.

Figure 6:
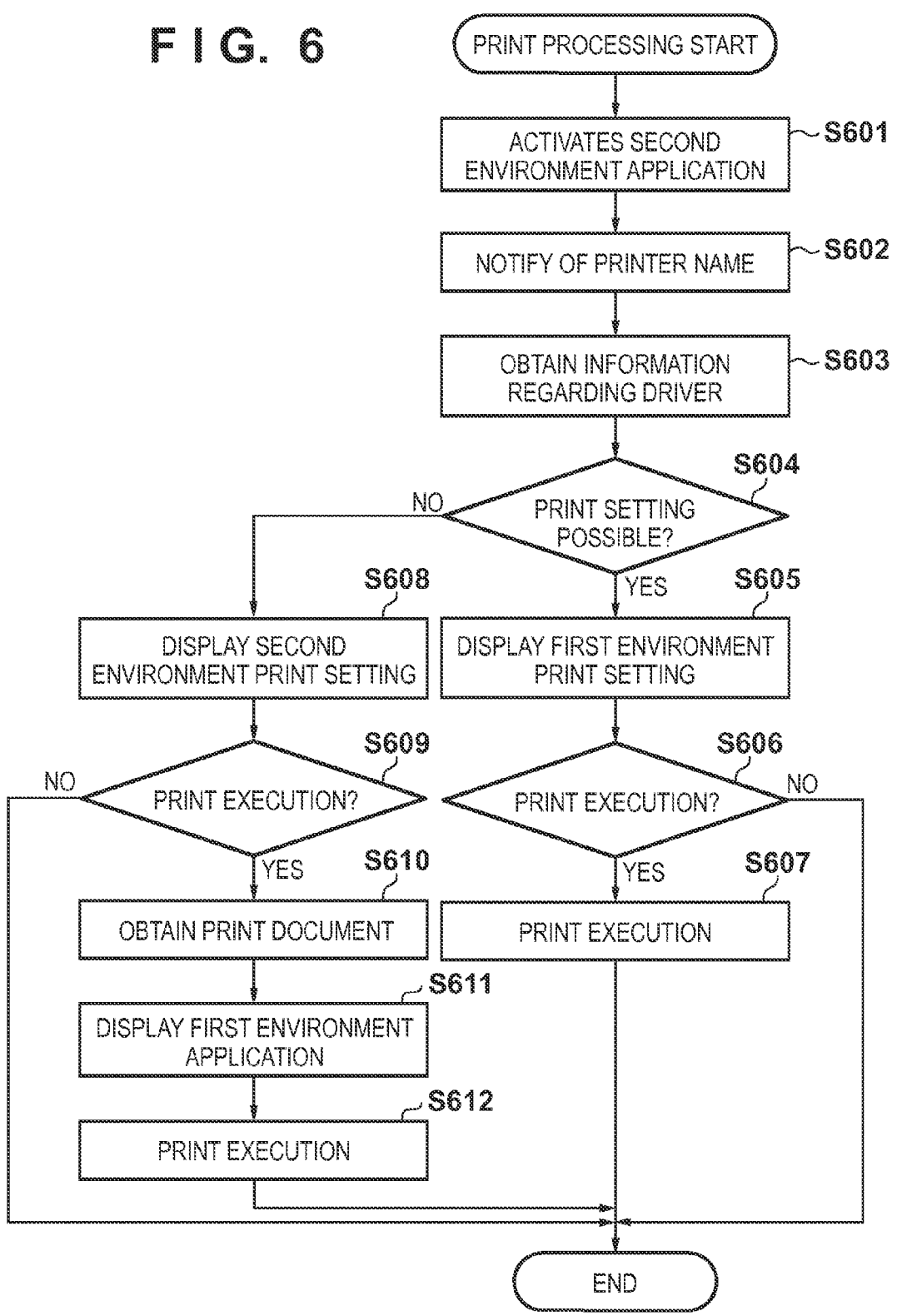
FIG. 6 is a flowchart illustrating the procedure when print settings and print output of a first embodiment are performed.

FIG. 6 is a flowchart illustrating print output processing of the present embodiment performed by the first environment application 204. The present processing is started by pushing the button 504 in the user interface 501. In step S601, the communication unit 303 activates a second environment application 205. Note that the second environment application 205 may be activated at the time of activation of the OS or the first environment application 204, and in this case, it is possible, in step S601, to determine whether the second environment application 205 has already been activated, and to activate the second environment application 205 only if it is determined that the second environment application 205 has not been yet activated.

In step S602, the communication unit 303 obtains the name of the printer driver that is currently selected with the control 503, and notifies a communication unit 403 of the second environment application 205 of the obtained name. Then, in step S603, the communication unit 303 requests the communication unit 403 to obtain information regarding the printer driver that is currently selected by the user. The communication unit 403 of the second environment application 205 that was requested to obtain the driver information references the received name of the printer driver and obtains, through the print control unit 402, information regarding the corresponding printer driver. According to the present embodiment, the request for obtaining the information is made from the second environment application 205 to the second environment execution basic software 203, and the second environment execution basic software 203 obtains the information regarding the first environment printer driver 206 or the second environment printer driver 207, which depends on the name. Examples of the information regarding the printer driver encompass version information of the printer driver. And, the communication unit 403 notifies of the obtained information regarding the printer driver the communication unit 303 of the first environment application 204, and the communication unit 303 that has received the printer driver information delivers it to the print control unit 302.

In step S604, the print control unit 302 references the printer driver information, and determines whether a print setting UI of the printer driver is displayable in the first environment. If it is determined that the print setting UI of the printer driver is displayable, the procedure advances to step S605, and otherwise, the procedure advances to step S608. The determination in step S604 is made in such a manner that, for example, version information of the driver is obtained from the printer driver information that is referenced, and it is determined whether or not the version number is greater than or equal to a predetermined value, and if the version number is greater than or equal to a predetermined value, it is then determined that the print setting UI is displayable, and if the version number is less than the predetermined value, it is then determined that the print setting UI is not displayable. In the present embodiment, if the first environment printer driver 206 has been selected, the version number is greater than a predetermined value, so that it is determined that the print setting UI of the first environment printer driver 206 is displayable in the first environment. And if the second environment printer driver 207 has been selected, the version number is less than the predetermined value, so that it is determined that the print setting UI of the second environment printer driver 207 is not displayable in the first environment. More specifically, the major version number of the WinRT printer driver is, for example, 4, and the major version number of the Win32 printer driver is, for example, 3. Therefore, in step S604, it is determined whether or not the version number is greater than or equal to a threshold of 4, and if the version number is greater than or equal to 4, it is determined that the driver is compatible with WinRT and print settings are displayable in the metro style UI, and otherwise, it is determined that print settings are not displayable. As described above, even if the version number is less than 4, print settings that are compatible with the OS are displayable also in the metro style UI. However, in step S604, if the version number is less than 4, then it is determined that the print settings are not displayable since the print settings originally defined for the driver cannot be displayed. Note that the determination of possibility of print setting in step S604 can be a determination of whether or not print settings regarding expanded functionality can be made in the first environment. This is because only simple print settings can be configured through the print setting UI that is provided by the OS.

Figure 8:
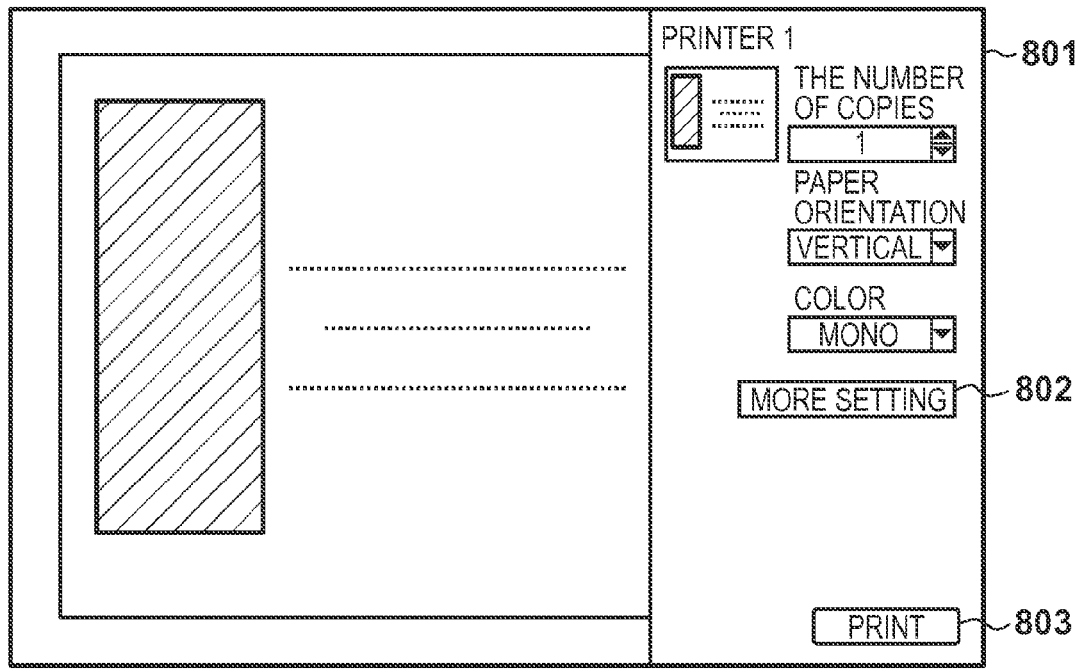
FIG. 8 is a diagram illustrating an example of a user interface for print settings of the first environment application.

In step S605, the UI management unit 301 displays a print setting user interface 801 of FIG. 8 that is held by the first environment printer driver 206. If a button 802 is pushed, the UI for print settings is displayed through which advanced print settings of the first environment printer driver 206 (not shown) can be configured. If a button 803 is pushed, execution of print output is started. In step S606, the UI management unit 301 determines whether or not execution of print output is instructed by the user (whether or not the button 803 is pushed). If it is determined that execution of print output is instructed, the procedure advances to step S607, and if an operation other than the print output was executed, the processing that corresponds to that operation is performed. In step S607, the print control unit 302 performs print processing using a document file that is to be printed and was read by the first environment application 204. And, the first environment printer driver 206 receives data to be printed, and converts the received data into a control command that can be recognized by the printer, for example a PDL (Page Description Language). The converted printer control command is outputted, as print data, to the printer 3 via the network 7.

In step S608, the communication unit 303 requests the communication unit 403 to display a UI for printing. And, the communication unit 403 requested to display a UI for printing displays, via the UI management unit 401, the UI 901 of FIG. 9A, which is a UI for print in the second environment. Here, the second environment application 205 can display the second environment UI by the second environment printer driver 207 via the second environment execution basic software. Besides, the second environment printer driver 207 can access the print setting data, which is in the binary format in the present embodiment, so as to display all the print settings including the items regarding original functionalities of the printer. For example, the Win32 printer driver can display, in a UI of the desktop style, print settings including original settings of the driver, which were defined in DEVMODE, in order to hold the print setting data in DEVMODE. If a button 902 is pushed, a UI 951 for print settings (illustrated in FIG. 9B) that is of the second environment printer driver 207 is displayed. Through the UI 951 for print settings, it is possible to configure advanced settings of functionalities, such as paper size, layout, finishing, and the like, when performing printing. If a button 903 is pushed, the print output processing is started. If a button 904 is pushed, then the print processing is stopped.

In step S609, the UI management unit 401 determines whether or not execution of the print output has been instructed by the user (the button 903 has been pushed). If it is determined that execution of the print output has been instructed, the procedure advances to step S610, and if an operation other than the print output has been executed, the processing that corresponds to that operation is performed. In step S610, the communication unit 403 obtains, via the communication unit 303, a document file that is to be printed and was read by the first environment application 204. In step S611, the communication unit 403 notifies the communication unit 303 of the start of the execution of the print output. The communication unit 303, which has received the notification of the print start, displays the user interface 501 via the UI management unit 301 so that the focus is changed to the user interface of the first environment application 204. That is, the second environment application gives the first environment application opportunity to shift the focus. In this context, "focus" means to define, as a target for operation, any one of a plurality of windows displayable in, for example, the desktop style of Windows 8, while the plurality of windows are being displayed. This causes the user interface of the first environment application 204 to be operable. Here, it is also possible to display that printing is started.

In step S612, the print control unit 402 executes print processing using the document file to be printed that was obtained in the step S610. And, the second environment printer driver 207 receives the data to be printed, and converts the data into a control command that can be recognized by the printer, for example a PDL (Page Description Language). The converted printer control command is outputted, as data to be printed, to the printer 3 via the network 7. Note that the method of communication between the communication unit 304 and the communication unit 403 is not specifically limited, and may be a method in which they observe, from each other, files that exist in specific folders, for example, so as to transmit and receive information.

Print Processing Event Notification Processing

Figure 7:
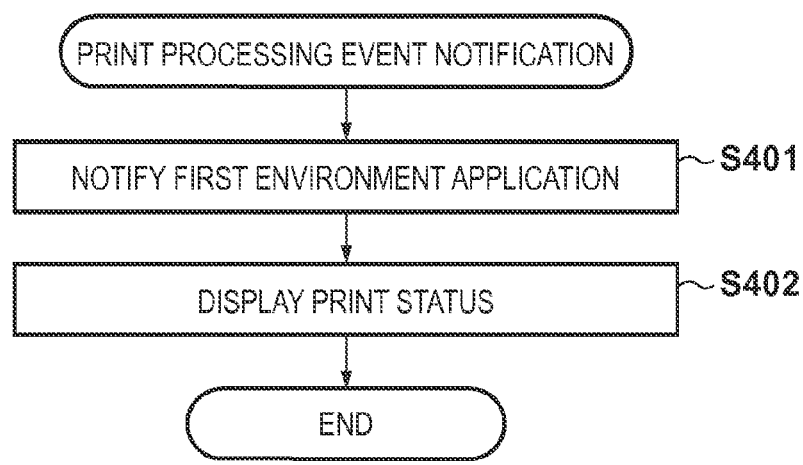
FIG. 7 is a flowchart illustrating processing when status is notified after performing printing.

FIG. 7 is a flow of processing performed when a status change, such as completion of the printing or a print error, has occurred, in step S612 in which print output of the document file read by the first environment application 204 is performed via the second environment application 205. Since the print output is performed from the second environment application 205, the second environment application 205 is notified of an event occurrence, that is, a status change. In step S401, the communication unit 403 that has received the information to notify the event occurrence, notifies the communication unit 303 of the received information. In step S402, the communication unit 303 displays, in accordance with the contents of the received notification, the contents of the notification via the UI management unit 301. The UI management unit 301 displays the contents of the notification using the first environment execution basic software 202. With this procedure, it is possible for the first environment application 204, which has executed the printing, to display the printing status.

The above-described configuration and procedure allow the first environment application, when printing is performed from the first environment application using the second environment printer driver, to determine this fact in advance, and to activate the second environment application (the second environment UI application). The second environment application is able to display, via the second environment execution basic software, the UI that is provided by the second environment printer driver. Therefore, it is possible to configure print settings including the functionalities that are originally provided by the second environment printer driver, thus allowing the functionalities to be available.

Further, a notification of an event that has occurred in the print processing is delivered to the first environment application via the second environment application, so that the event notification is delivered not to the second environment application, which has requested the operating system to perform the print processing, but the first environment application, which is the actual source of the request for the print processing. This can make the second environment printer driver available, without letting the user be aware of the existence of the first environment application.

Second Embodiment

In the first embodiment, if it is determined, in step S604, that print settings cannot be configured, then the print settings are configured using the UI of the printer driver via the second environment application 205. The present embodiment has a flow in which a print setting UI is displayed by the first environment application 204. The following will describe the operation between steps S1001 to S1005, which is a difference between the first embodiment and the second embodiment. Other steps are common to the first and second embodiments, and therefore their further description is omitted.

In step S1001, the communication unit 303 of the first environment application 204 requests the communication unit 403 of the second environment application 205 to obtain information on functionality of the second environment printer driver 207. Together with the obtainment request, the name of the printer driver is delivered. The communication unit 403 that has been requested to obtain information on functionality of the second environment printer driver 207 references the received name of the printer driver via the print control unit 402, and obtains information on functionality of the second environment printer driver 207 that is associated with the name (that is, information on print functionality). In this case, the print control unit 402 obtains the information on functionality, using print setting data in the binary format (for example, DEVMODE) that was defined through the interface provided by the second environment execution basic software 203. However, if the information on functionality of the second environment printer driver 207 can be obtained using print setting data in the XML format (for example, PrintTicket) that was defined through the interface provided by the second environment execution basic software 203, then it is possible to obtain, together with the print setting data in the binary format, the print setting data in the XML format. It is also possible to use print setting data regarding which more information could be obtained. Note that in this context, the information on functionality refers to information on functionalities available when printing. Such information includes information on, for example, selectable types of paper, whether or not bookbinding printing and saddle stitching (output of pamphlets) printing are possible. And, the communication unit 403 that has received the information on functionality notifies the communication unit 303 of the obtained information on functionality.

Figure 11:
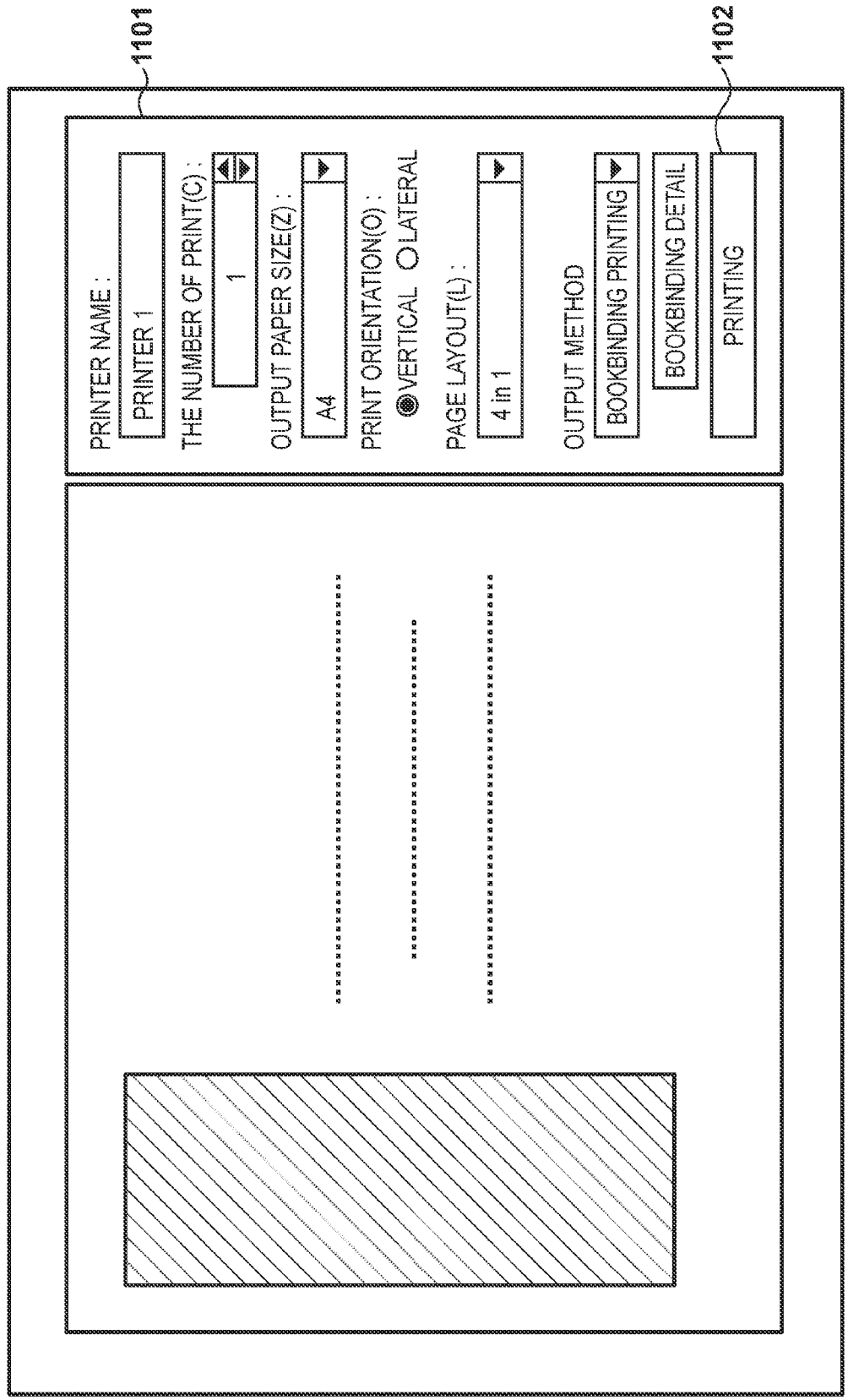
FIG. 11 is a diagram illustrating an example of a user interface for print settings of the first environment application.

In step S1002, the communication unit 303 of the first environment application 204 that has received the information on functionality of the second environment printer driver 207 delivers the information on functionality to the UI management unit 301, and the UI management unit constructs and displays a print setting UI 1101 of FIG. 11, with reference to the information on functionality. Through the print setting UI 1101, it is possible when performing printing to configure settings of detailed functionalities, such as paper size, page layout, finishing, and the like. If a button 1102 is pushed, then the print output processing is started.

In step S1003, the UI management unit 301 determines whether or not execution of print output has been instructed by the user (the button 1102 was pushed). If it is determined that execution of the print output has been instructed, the procedure advances to step S1004, and if an operation other than the print output was executed, the processing that corresponds to that operation is performed. In step S1004, the communication unit 303 transmits, to the communication unit 403 of the second environment application 205, print setting data to which print settings were reflected that is configured by the user using a document file to be printed that was read into the first environment application 204, and the UI 1101.

In step S1005, the print control unit 402 of the second environment application 205 executes print processing using the document file to be printed that was transmitted in step S1004, and the print setting data. And, the second environment printer driver 206 receives, via the second environment execution basic software 203, the data to be printed and converts the data into a control command that can be recognized by the printer, for example a PDL (Page Description Language). The converted printer control command is outputted, as print data, to the printer 3 via the network 7.

Note here that, since the print setting data is not reflected on DEVMODE, there is an agreement that was made in advance and relates to definition of print settings between the first environment application and the second environment application in order to enable the second environment printer driver to reflect its print settings on printing. And, the second environment application 205 that has received the print data and print setting data accesses DEVMODE directly or indirectly so as to reflect them on printing, and then delivers the print data to the second environment printer driver via the operating system so as to perform printing.

With the above-described procedure, the second environment printer driver 207 provides the first environment application 204 with the capacity of the second environment printer driver 207 and causes the first environment application 204 to display and to configure settings, and the second environment application 205 causes the second environment printer driver 207 to perform printing, using print data and print settings. Therefore, functionalities provided by the second environment printer driver are available from the first environment application. It is also possible, by the second environment application performing the procedure in FIG. 7 as with the first embodiment, to cause the first environment application 204 to display an event, such as a status change and an error.

Third Embodiment

Figure 12:
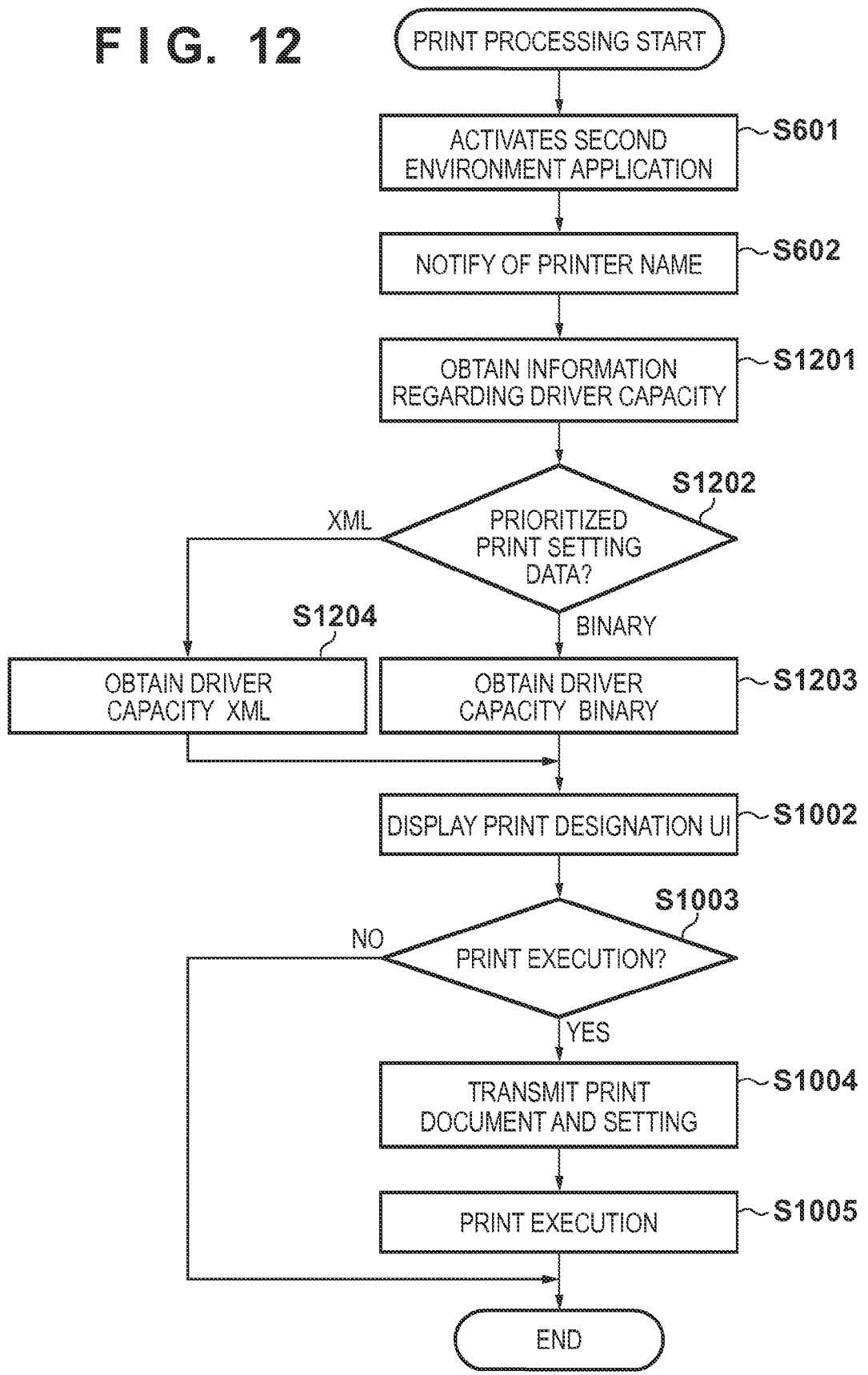
FIG. 12 is a flowchart illustrating the procedure when print settings and print output of a third embodiment are performed.

In the second embodiment, if it is determined, in step S604, that first environment printer driver 206 can configure print settings, then the procedure advances to step S605 since the first environment printer driver 206 can display the print setting UI. However, the first environment application 204 can neither construct nor display the UI through which settings of the functionalities of the first environment printer driver 206 are configured, since it cannot obtain information on detailed functionalities of the first environment printer driver 206, using the interface provided by the first environment execution basic software 202. Therefore, by always advancing to step S1001 without performing the determination in step S604, it is possible to use the interface provided by the second environment execution basic software 203 so as to obtain information on the functionalities of the first environment printer driver 206. The following will describe the operation in steps S1201 to S1204, which is a difference between the second embodiment and the third embodiment, with reference to the flowchart in FIG. 12.

In step S1201, the communication unit 303 requests the communication unit 403 to obtain information on functionality of the printer driver 207 in accordance with the name of the printer driver that has been selected by the user.

In step S1202, the communication unit 403 that has been requested in step S1201 decides a format to be obtained as print setting data from the printer driver via the print control unit 402. Since there is a printer driver that is compatible with both formats, the format to be decided here is a format that is preferentially obtained. For example, the printer driver information is obtained, and it is determined with reference to the version whether or not the version number is greater than or equal to a predetermined value. If the version number is greater than or equal to a predetermined value, then it is determined that the print setting data is in the XML format, and otherwise, it is determined that the print setting data is in the binary format. The determination of whether or not the version number is greater than or equal to a predetermined value can be made with the same standard as that in step S604 of the first embodiment.

If it is determined that the print setting data is in the binary format, the procedure advances to step S1203, and if it is determined that the print setting data is in the XML format, the procedure advances to step S1204. The format of the print setting data that is used by the first environment printer driver 206 is the XML format, which was defined through the interface provided by the first environment execution basic software 202. The format of the print setting data that is used by the second environment printer driver 207 is the binary format, which was defined through the interface provided by the second environment execution basic software 203. Here, as with the second embodiment, if the information on functionality of the second environment printer driver 207 can be obtained using print setting data in the XML format defined through the interface provided by the second environment execution basic software 203, then it is possible to obtain print setting data in both formats and to decide to use the print setting data regarding which more information could be obtained.

In step S1203, the communication unit 403 notifies the communication unit 303 of the information on functionality in the binary format of the printer driver that has been obtained by the print control unit 402. In step S1204, the communication unit 403 notifies the communication unit 303 of the information on functionality in the XML format of the printer driver that has been obtained by the print control unit 402. The procedure after step S1002 is equivalent to that in the second embodiment.

The configuration of the present embodiment allows achieving, in addition to the effect of the second embodiment, another effect that the first environment application 205 can have freedom to construct and display a print setting UI, irrespective of printer drivers.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-053688, filed Mar. 9, 2012, which is hereby incorporated by reference herein in its entirety.

What is claimed is:

1. An information processing apparatus for performing printing using a printer driver that is managed by an operating system providing a plurality of different execution environments for application programs, a compatible print setting data format being defined in advance for each of the execution environments, the information processing apparatus executing a first application that is operated under a first execution environment, the information processing apparatus comprising:
    an obtainment unit configured to obtain information regarding a printer driver to be used;
    a determination unit configured to determine, on the basis of the obtained information regarding the printer driver, whether print settings and print processing are executed in the first execution environment or in a second execution environment;
    a display unit configured, if it is determined that the print settings and the print processing are executed in the second execution environment, to let a second application that is operated under the second execution environment display a user interface through which the print settings are executed in the printer driver; and
    a unit configured to transmit document data to be printed to the second application so as to let the second application execute print output.

2. The information processing apparatus according to claim 1,
    wherein the information regarding the printer driver obtained by the obtainment unit includes a version of the printer driver, and
    the determination unit is configured to determine, on the basis of the version of the printer driver obtained by the obtainment unit, the first execution environment or the second execution environment that is compatible with a format of the print setting data of the printer driver, as an execution environment in which the print settings and the print processing are executed.

3. The information processing apparatus according to claim 1,
    wherein the second application includes a unit that is configured to let the first application display a user interface when executing the print output.

4. The information processing apparatus according to claim 1,
wherein, upon receiving a notification of an event from the printer driver, the second application notifies the first application of the notification.

5. An information processing apparatus for performing printing using a printer driver that is managed by an operating system providing a plurality of different execution environments for application programs, a compatible print setting data format being defined in advance for each of the execution environments, the information processing apparatus executing a first application that is operated under a first execution environment, the information processing apparatus comprising:
   an obtainment unit configured to obtain information regarding a printer driver to be used;
   a determination unit configured to determine, on the basis of the obtained information regarding the printer driver, whether print settings and print processing are executed in the first execution environment or in a second execution environment;
   a display unit configured, if it is determined that the print settings and the print processing are executed in the second execution environment, to let a second application that is operated under the second execution environment obtain information regarding print functionality of the printer driver, and to display an user interface through which the print settings are executed on the basis of the information regarding print functionality; and
   a unit configured to transmit document data to be printed and the print settings to the second application so as to let the second application execute print output according to the print settings.

6. The information processing apparatus according to claim 5,
wherein the information regarding a printer driver obtained by the obtainment unit includes a version of the printer driver, and
the determination unit is configured to determine, on the basis of the version of the printer driver obtained by the obtainment unit, the first execution environment or the second execution environment that is compatible with a format of the print setting data of the printer driver, as an execution environment in which the print settings and the print processing are executed.

7. An information processing apparatus for performing printing using a printer driver that is managed by an operating system providing a plurality of different execution environments for application programs, a compatible print setting data format being defined in advance for each of the execution environments, the information processing apparatus executing a first application that is operated under a first execution environment, the information processing apparatus comprising:
   a determination unit configured to let a second application that is operated under a second execution environment obtain a version of a printer driver to be used, and to determine a format of print setting data that is prioritized in accordance with the version;
   an obtainment unit configured to let the second application obtain, from the printer, information regarding print functionality of the printer driver, in the format determined by the determination unit;
   a display unit configured to display, on the basis of the information regarding print functionality obtained by the obtainment unit, a user interface through which print settings are executed; and
   a unit configured, if the prioritized print setting data is in a format that is compatible with the second execution environment, to transmit document data to be printed and the print settings to the second application so as to let the second application execute print output according to the print settings, and if the prioritized print setting data is in a format that is compatible with the first execution environment, to transmit document data to be printed to the second application so as to let the second application execute print output.

8. An information processing apparatus according to claim 7,
wherein the obtainment unit is configured to obtain the information regarding print functionality in formats that are respectively compatible with the first execution environment and the second execution environment, and to determine a format of print data more functionalities of which are included in the information as the format of print data that is prioritized.

9. A non-transitory computer readable medium in which a first application program that is operated in a first execution environment is stored, the first application program causing a computer to serve as an information processing apparatus for performing printing using a printer driver that is managed by an operating system providing a plurality of different execution environments for application programs, a compatible print setting data format being defined in advance for each of the execution environments, the first application program comprising:
   an obtaining step of obtaining information regarding a printer driver to be used;
   a determining step of determining, on the basis of the obtained information regarding the printer driver, whether print settings and print processing are executed in the first execution environment or in a second execution environment;
   a displaying step of letting, if it is determined that the print settings and the print processing are executed in the second execution environment, a second application that is operated under the second execution environment display a user interface through which the print settings are executed in the printer driver; and
   a step of transmitting document data to be printed to the second application so as to let the second application execute print output.

10. The non-transitory computer readable medium according to claim 9,
wherein the information regarding the printer driver obtained in the obtaining step includes a version of the printer driver, and
the determining step determines, on the basis of the version of the printer driver obtained in the obtaining step, the first execution environment or the second execution environment that is compatible with a format of the print setting data of the printer driver, as an execution environment in which the print settings and the print processing are executed.

11. The non-transitory computer readable medium according to claim 9,
wherein the first application program further comprises the step of displaying a user interface in response to a notification of print output execution made by the second application.

12. The non-transitory computer readable medium according to claim 9,
wherein the first application program is configured to receive, from the second application, an event of which the printer driver has notified the second application.

13. A non-transitory computer readable medium in which a first application program that is operated in a first execution environment is stored, the first application program causing a computer to serve as an information processing apparatus for performing printing using a printer driver that is managed by an operating system providing a plurality of different execution environments for application programs, a compatible print setting data format being defined in advance for each of the execution environments, the first application program comprising:
an obtaining step of obtaining information regarding a printer driver to be used;
a determining step of determining, on the basis of the obtained information regarding the printer driver, whether print settings and print processing are executed in the first execution environment or in a second execution environment;
a displaying step of letting, if it is determined that the print settings and the print processing are executed in the second execution environment, a second application that is operated under the second execution environment obtain information regarding print functionality of the printer driver, and displaying an user interface through which the print settings are executed on the basis of the information regarding print functionality; and
a step of transmitting document data to be printed and the print settings to the second application so as to let the second application execute print output according to the print settings.

14. The non-transitory computer readable medium according to claim 13,
wherein the information regarding the printer driver obtained in the obtaining step includes a version of the printer driver, and
the determination step determines, on the basis of the version of the printer driver obtained in the obtaining step, the first execution environment or the second execution environment that is compatible with a format of the print setting data of the printer driver, as an execution environment in which the print settings and the print processing are executed.

15. A non-transitory computer readable medium in which a first application program that is operated in a first execution environment is stored, the first application program causing a computer to serve as an information processing apparatus for performing printing using a printer driver that is managed by an operating system providing a plurality of different execution environments for application programs, a compatible print setting data format being defined in advance for each of the execution environments, comprising:
a determining step of letting a second application that is operated under a second execution environment obtain a version of a printer driver to be used, and determining a format of print setting data that is prioritized in accordance with the version;
an obtaining step of letting the second application obtain, from the printer, information regarding print functionality of the printer driver, in the format determined in the determining step;
a displaying step of displaying, on the basis of the information regarding print functionality obtained in the obtaining step, a user interface through which print settings are executed; and
a step of transmitting document data to be printed and the print settings to the second application so as to let the second application execute print output according to the print settings, if the prioritized print setting data is in a format that is compatible with the second execution environment, and transmitting document data to be printed to the second application so as to let the second application execute print output, if the prioritized print setting data is in a format that is compatible with the first execution environment.

16. The non-transitory computer readable medium according to claim 15,
wherein the obtaining step obtains the information regarding print functionality in formats that are respectively compatible with the first execution environment and the second execution environment, and determines a format of print data more functionalities of which are included in the information as the format of print data that is prioritized.

17. A method for processing information so as to perform printing using a printer driver that is managed by an operating system providing a plurality of different execution environments for application programs, a compatible print setting data format being defined in advance for each of the execution environments, in which a first application that is operated under a first execution environment is executed, the method comprising:
an obtaining step of obtaining information regarding a printer driver to be used;
a determining step of determining, on the basis of the obtained information regarding the printer driver, whether print settings and print processing are executed in the first execution environment or in a second execution environment;
a displaying step of letting, if it is determined that the print settings and the print processing are executed in the second execution environment, a second application that is operated under the second execution environment display a user interface through which the print settings are executed in the printer driver; and
a step of transmitting document data to be printed to the second application so as to let the second application execute print output.

18. A method for processing information so as to perform printing using a printer driver that is managed by an operating system providing a plurality of different execution environments for application programs, a compatible print setting data format being defined in advance for each of the execution environments, in which a first application that is operated under a first execution environment is executed, the method comprising:
an obtaining step of obtaining information regarding a printer driver to be used;
a determining step of determining, on the basis of the obtained information regarding the printer driver, whether print settings and print processing are executed in the first execution environment or in a second execution environment;
a displaying step of letting, if it is determined that the print settings and the print processing are executed in the second execution environment, a second application that is operated under the second execution environment obtain information regarding print functionality of the printer driver, and displaying an user interface through which the print settings are executed on the basis of the information regarding print functionality; and a step of transmitting document data to be printed and the print settings to the second application so as to let the second application execute print output according to the print settings.

19. A method for processing information so as to perform printing using a printer driver that is managed by an operating system providing a plurality of different execution environments for application programs, a compatible print setting data format being defined in advance for each of the execution environments, in which a first application that is operated under a first execution environment is executed, the method comprising:

a determining step of letting a second application that is operated under a second execution environment obtain a version of a printer driver to be used, and determining a format of print setting data that is prioritized in accordance with the version;

an obtaining step of letting the second application obtain, from the printer, information regarding print functionality of the printer driver, in the format determined in the determining step;

a displaying step of displaying, on the basis of the information regarding print functionality obtained in the obtaining step, a user interface through which print settings are executed; and a step of transmitting document data to be printed and the print settings to the second application so as to let the second application execute print output according to the print settings, if the prioritized print setting data is in a format that is compatible with the second execution environment, and transmitting document data to be printed to the second application so as to let the second application execute print output, if the prioritized print setting data is in a format that is compatible with the first execution environment.

* * * * *